United States Patent
Dagli et al.

(10) Patent No.: US 11,780,492 B2
(45) Date of Patent: Oct. 10, 2023

(54) DETECTION OF HIGH FRICTION, IN AN ELECTRICAL POWER STEERING GEAR, DUE TO RUST

(71) Applicant: Robert Bosch Automotive Steering LLC, Florence, KY (US)

(72) Inventors: Ismail Dagli, Ludwigsburg (DE); Achim Frankovics, Novi, MI (US); Rudy Audi, Northville, MI (US); Divyendu Narayan, Farmington Hills, MI (US)

(73) Assignee: ROBERT BOSCH AUTOMOTIVE STEERING LLC, Florence, KY (US)

( * ) Notice: Subject to any disclaimer, the term of this patent is extended or adjusted under 35 U.S.C. 154(b) by 251 days.

(21) Appl. No.: 16/342,367

(22) PCT Filed: Nov. 3, 2017

(86) PCT No.: PCT/US2017/059901
§ 371 (c)(1),
(2) Date: Apr. 16, 2019

(87) PCT Pub. No.: WO2018/093587
PCT Pub. Date: May 24, 2018

(65) Prior Publication Data
US 2019/0241211 A1    Aug. 8, 2019

Related U.S. Application Data

(60) Provisional application No. 62/416,784, filed on Nov. 3, 2016.

(51) Int. Cl.
*B62D 5/04*    (2006.01)
*B62D 6/00*    (2006.01)

(52) U.S. Cl.
CPC .......... *B62D 5/0481* (2013.01); *B62D 6/00* (2013.01)

(58) Field of Classification Search
CPC ............. B62D 5/0481; B62D 5/0484; B62D 5/0487; B62D 5/0493; B62D 6/00; B62D 6/001;
(Continued)

(56) References Cited

U.S. PATENT DOCUMENTS 7,610,127 B2 * 10/2009 D'Silva .............. B60T 8/17551
701/33.9
8,392,055 B2 * 3/2013 Schusteritz .......... B62D 5/0481
701/41
(Continued)

FOREIGN PATENT DOCUMENTS

CN    102730055 A    10/2012
CN    106004994 A    10/2016
(Continued)

OTHER PUBLICATIONS

International Search Report and the Written Opinion of the International Searching Authority, dated Apr. 20, 2018; Intl. Appl. No. PCT/US2017/059901.
Chinese Patent Office Action for Application No. 201780068034.6 dated Feb. 3, 2021 (14 pages including statement of relevance).
The State Intellectual Property Office of People's Republic of China Second Office Action for Application No. 201780068034.6 dated Sep. 15, 2021 (12 pages including translation).

*Primary Examiner* — Christian Chace
*Assistant Examiner* — Shayne M. Gilbertson
(74) *Attorney, Agent, or Firm* — Michael Best & Friedrich LLP

(57) ABSTRACT

The system (10) is configured to detect high friction in a steering gear used with a vehicle. The system (10) has a speed sensor (17), a steering angle sensor (17, 108), a
(Continued)

plurality of vehicle sensors (23, 112) to monitor vehicle parameters and a plurality of steering system sensors (17, 108) to monitor steering system parameters. A repository stores (27, 120) the normal operating values for the vehicle and steering system sensors (17, 108). A correlation block (21, 130) compares the vehicle and steering system values with the values in the repository (27, 120). A trigger block (15) receives signals from the speed and steering angle sensors, and activating the correlation block (21, 130) when the speed and steering angle sensors are in a select range. The correlation block (21, 130) sends a warning signal if the values from the repository (27, 120) and the signal from the speed and steering angle sensors (17, 108) exceed a predetermined value.

12 Claims, 3 Drawing Sheets

(58) Field of Classification Search
CPC ...... B62D 6/002; B62D 6/004; B62D 15/029; B62D 5/0457; B60G 2400/40; B60G 2400/41; B60G 2500/40; B60G 2800/96; B60R 2021/01313; F02N 11/084; F02N 2200/0808; Y10T 74/20256

USPC .................................................... 701/41, 42
See application file for complete search history.

(56) References Cited

U.S. PATENT DOCUMENTS

| | | | |
|---|---|---|---|
| 8,666,604 B2* | 3/2014 | Fehlings | B62D 5/0481 701/41 |
| 2009/0150018 A1* | 6/2009 | Brown | B62D 5/0481 701/31.4 |
| 2010/0256870 A1* | 10/2010 | Klein | B62D 5/0481 701/41 |
| 2011/0153035 A1 | 6/2011 | Grichnik et al. | |
| 2013/0325263 A1 | 12/2013 | Yang et al. | |
| 2016/0001815 A1* | 1/2016 | Sasaki | B62D 5/0487 701/41 |
| 2018/0194390 A1* | 7/2018 | Goto | B62D 5/046 |

FOREIGN PATENT DOCUMENTS

| | | |
|---|---|---|
| DE | 102008055874 A1 | 11/2009 |
| JP | 2006298234 A | 11/2006 |
| JP | 2012194035 A | 10/2012 |
| KR | 100204770 B1 * | 6/1999 |

* cited by examiner

DETECTION OF HIGH FRICTION, IN AN ELECTRICAL POWER STEERING GEAR, DUE TO RUST

BACKGROUND OF THE INVENTION

The present invention is directed to a steering system that can detect unacceptably high levels of friction in the steering system. In most of today's vehicles the steering system is power assisted and it is difficult to determine when problems develop in the system. In particular, the steering gear for the steering system is usually located in a very low position in the front of the vehicle. It is not unusual for the steering gear to be damaged in a way that allows water to intrude into the steering gear. Normally there is a rubber bellow positioned around the area of the steering gear and any failures in the bellow can allow water to enter the steering gear. The presence of water can cause the steering gear to rust and when the rust becomes significant the steering gear can fail. Unfortunately, the driver of the vehicle is not always aware of the higher levels of friction present in the steering system due to the power assist provided to the driver of the vehicle. If the rust sufficiently damages the steering gear, it is possible for the steering gear to fail resulting in a vehicle that is not operable. As the level of rust develops, the force necessary to operate the steering gear will increase. If the force required to operate the steering gear becomes too high, the power assist provided to the steering system may be overly stressed to offset the increased force required to steer the vehicle and this could result in unacceptable level of force to turn the steering wheel for the vehicle. In addition, when rust is present, if there is a failure of the power assist in the steering system, level of force necessary to steer the vehicle may become unacceptably high to operate the vehicle safely. In addition, allowing the rust to develop to a point where the steering gear components are compromised will result in an expensive repair that could've been avoided if the presence of rust was detected at an earlier time Accordingly, there is a need for a rust detection system for the steering system that warns the driver when the force necessary to operate the steering system has increased beyond a normal level. The detection system will need to calculate a correlation between the different vehicle and steering gear parameters during the operation of the vehicle. The system will calculate the normal parameters for the steering system and provide a warning when the correlations between the current and normal parameters for the steering system indicate that the friction loads in the steering system are not at an acceptable level.

SUMMARY

The system is designed to detect high friction in a steering gear used within a vehicle. The device has a first sensor that monitors at least vehicle speed and a steering angle, a plurality of vehicle sensors to monitor vehicle parameters and a plurality of steering system sensors to monitor steering system parameters. A repository stores the normal operating values for the vehicle and steering system sensors. A correlation block compares the vehicle and steering system values with the values in the repository. A trigger block receives signals from the speed and steering angle sensors, and activating the correlation block when the speed and steering angle sensors are in a select range. Signals from other operating parameters can also be selected. The correlation block sends a warning signal if the values from the repository and the signal from the speed and steering angle sensors exceed a predetermined value.

DETAILED DESCRIPTION

The embodiments relate to a system for detecting abnormalities in the steering system for a vehicle. More particularly, the embodiments are directed to detecting rust that could be present in the steering system and impact the functioning of the steering system. The rust is normally found in the steering gear that is actuated to provide steering input to the steered wheels of the vehicle, although rust can also be found in other components of the steering system. The features will be more readily understood by referring to the attached drawings in connection with the following description.

In today's vehicles there are many systems that provide information that can be monitored and evaluated to determine the condition of the vehicle. The many variables that are available make it difficult to properly evaluate the information and determine if an abnormal condition exists that requires further investigation. Mathematical systems have been developed to help address this problem and allow multiple variables to be evaluated. The Mahalanobis-Taguchi System (MTS) is a diagnostic tool or pattern recognition tool that can be used to identify abnormality for a combination of multiple variables. Observation samples taken of the various variables, and normal groups are established for these variables. Once a sample of normal observations are constructed for the variables a reference base, the Mahalanobis (MS) is identified. Once the reference base is created the MTS system has the ability to differentiate normal readings from the group of variables from an abnormal group of readings. Using the sample of normal parameters/signals, a normal correlation matrix and mean values are established. These normal sets of parameters are used to calculate the Mahalanobis distance (MD). The MD provides an evaluation tool that helps to separate normal sets of parameters from abnormal sets of parameters. The difference between the correlation of the normal group and the abnormal group is the Mahalanobis Distance (MD). In essence, a relatively large value for the MD is used to produce a signal that an abnormal condition exists. The mathematical calculations that are used for the MTS evaluation are known in the art as is the calculation of the MD that allows for the identity of abnormal conditions in a group of variables. The details of the mathematical analysis are known in the art and do not need to be described in further detail.

Figure 1:
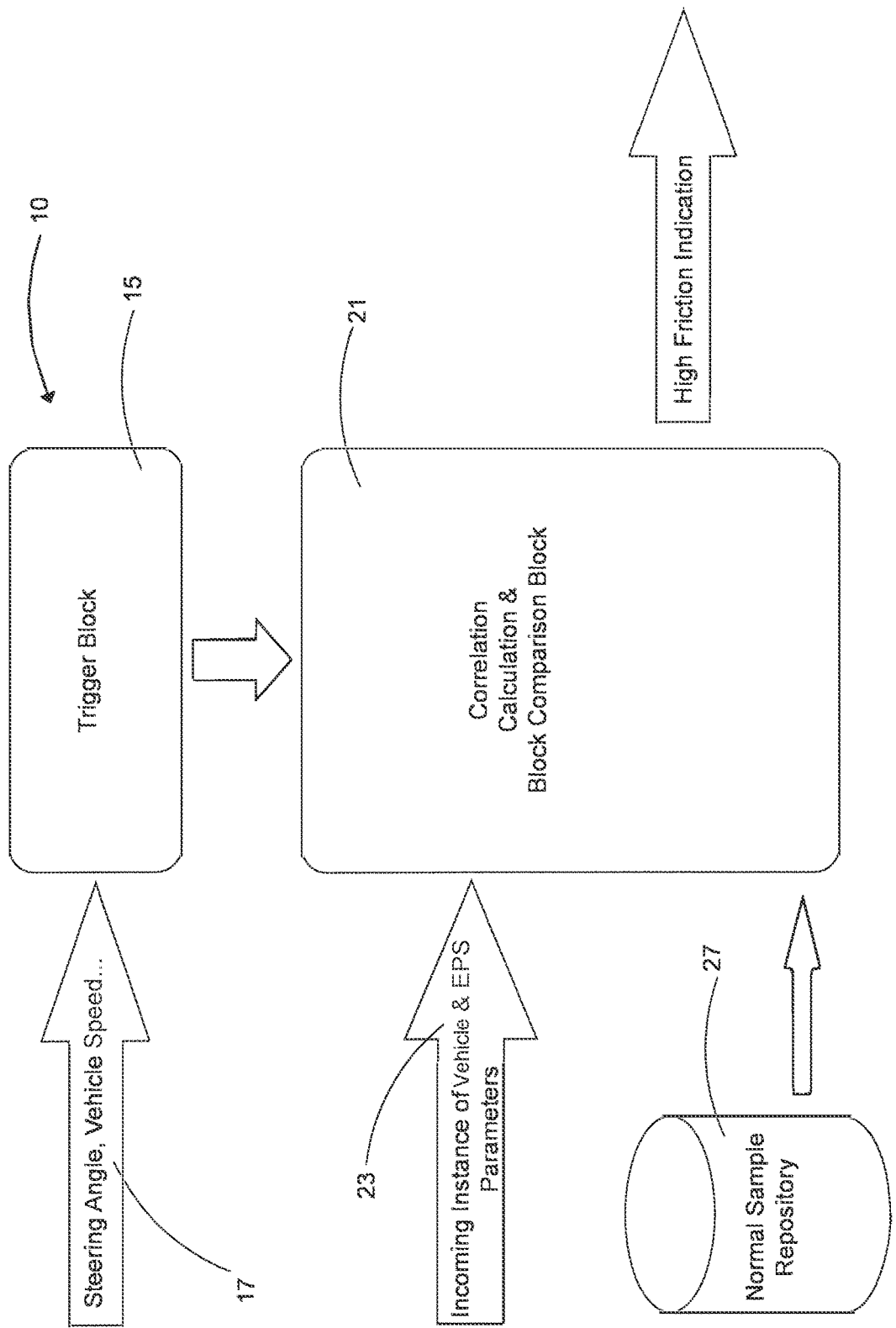
FIG. 1 is a schematic diagram of one arrangement.

FIG. 1 shows the system of one embodiment. The high friction detection system 10 has a trigger block 15 that is operatively connected to a correlation calculation and comparison block 21. The trigger block 15 is also operatively connected to first sensors 17 that provide parameters to the trigger block relative to the operation of the vehicle in which the high friction detection system 10 is located. Signals from the first sensors 17 are provided to the trigger block 15. The trigger block 15 monitors signals that are received from the first sensors 17 and determines if the signals are within a predetermined specific range. The first sensors 17 usually monitor the vehicle speed and steering angle of the vehicle, and these parameters are supplied to the trigger block 15. It should be recognized that the first sensors 17 can monitor other vehicle parameters and that these other parameters can be used to activate the trigger block. A specific range is predetermined for the steering angle and vehicle speed to correlate with operational parameters for the vehicle where high friction in the steering system can be detected. If the steering angle is below the preset value there is not sufficient loading in the steering system to detect high friction. If the vehicle is traveling below a certain speed the frictional load provided by the tires of the vehicle make it difficult to detect high friction in the steering system. Once the preset values for steering angle and vehicle speed have been reached, the vehicle is in an operational condition where the condition of the steering system can be evaluated.

A second set of sensors 23 is operatively connected to the correlation calculation and comparison block 21. The second set of sensors 23 monitor various driving parameters such as, steering rack force, lateral acceleration, longitudinal acceleration, vehicle speed, yaw rate, steering angle, steering speed, rotor angle, rotor speed, rotor motor torque and hand wheel (steering wheel) torque. The second set of sensors 23 provide a signal to the correlation calculation and comparison block 21 that provides values for these various parameters. The second set of sensors 23 provides the input signals to the correlation calculation and comparison block on a continuous basis while the vehicle is in operation.

Connected to the correlation calculation and comparison block is a normal sample repository 27. The repository can be preloaded with information concerning the normal ranges for the signals from the second set of sensors 23. The normal sample repository 27 would have information that consists of the mean, standard deviation, correlation matrix and the MD value for a normal steering system that is a system with no rust. In most applications the repository 27 is preloaded with these values based on observation and measurements taken from a steering system that is functionally identical to the steering system being monitored where the identical steering system has been evaluated and does not contain any rust or other flaws that would impact the readings from the second set of sensors 23. It is also possible that the repository 27 could learn or acquire normal operating parameters for the signals received from the second set of sensors 23 over an operational period for the vehicle. The only difficulty with having the repository learn the normal values for the signals from the second set of sensors is that if there is rust or some other defect already present in the steering system the establishment of the normal values will be corrupted. It is also possible that the repository 27 can monitor the signals from the second set of sensors 23 during the operation of the vehicle. The information learned during the monitoring of these signals can be added to the repository and used to adjust the normal range for the signals from the second set of sensors 23 as conditions for the vehicle change over a period of time. The amount of adjustment based on changes to the signals during the period of operation for the vehicle could be restricted so that the normal values initially preloaded into the repository 27 would not be overly influenced by changes in the signal that developed over a period of time.

In operation, the trigger block 15 is used to activate the correlation calculation and comparison block 21 only when the signals from the first set of sensors 17 are inside a specific range. The first set of sensors 17 are used to monitor the steering angle and vehicle speed so once these parameters are established to be inside the specific range the trigger block will activate the correlation calculation and comparison block. At that time the signals from the second set of sensors 23 calculates a correlation for the incoming signals and compares the incoming signals against the normal sample data that is in the normal sample repository 27. The correlation calculation and comparison block does a MTS evaluation. If any of the parameters provided by the second set of sensors 23 has a MD, which is one of the calculated values from the second set of sensors 23, that is unrelated to the normal sample, a signal will be sent that there is a rust issue or other flaw in the steering system. The signal sent from the correlation calculation and comparison block 21 will indicate that service is necessary for the steering system of the vehicle.

If the operational conditions, steering angle, vehicle speed, are outside of the specific range established in the trigger block 15, the trigger block will not activate the correlation calculation and comparison block to do an MTS evaluation of the steering system. If the parameters read by the trigger block 15 are within the specified range, the trigger block activate the correlation calculation and comparison block 21 and an ongoing evaluation will be made of the various signals from the second set of sensors 23. This evaluation of the signals from the second set of sensors 23 will continue until the signals received by the trigger block 15 are no longer in the specified range.

Figure 2:
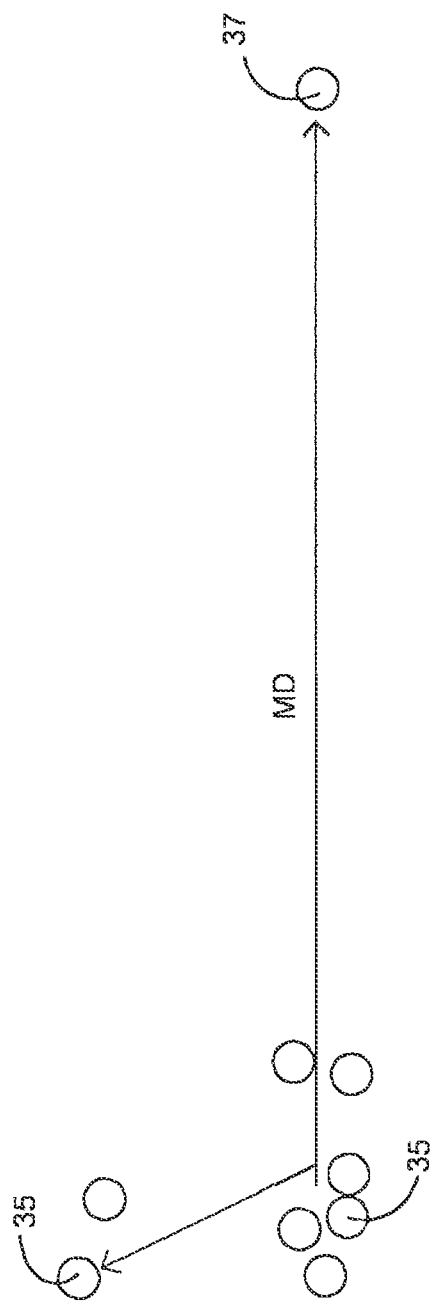
FIG. 2 is a graph of a set of variables that are measured as part of the arrangement.

FIG. 2 shows the basic evaluation process where a group of signals from a second set of sensors 23 are closely related and are indicated by dots 35. There is also shown in FIG. 2 a dot 37 that is sufficiently distant from the dots 37 that it is unrelated to the other elements. The distance between the grouped signals represented by dots 35 and the spaced apart dot 37 is the MD for the parameters represented by the signals. In this case the MD exceeds the predetermined level and this is an indication that there is a flaw in the steering system and a high likelihood that rust is present in the steering system.

Figure 3:
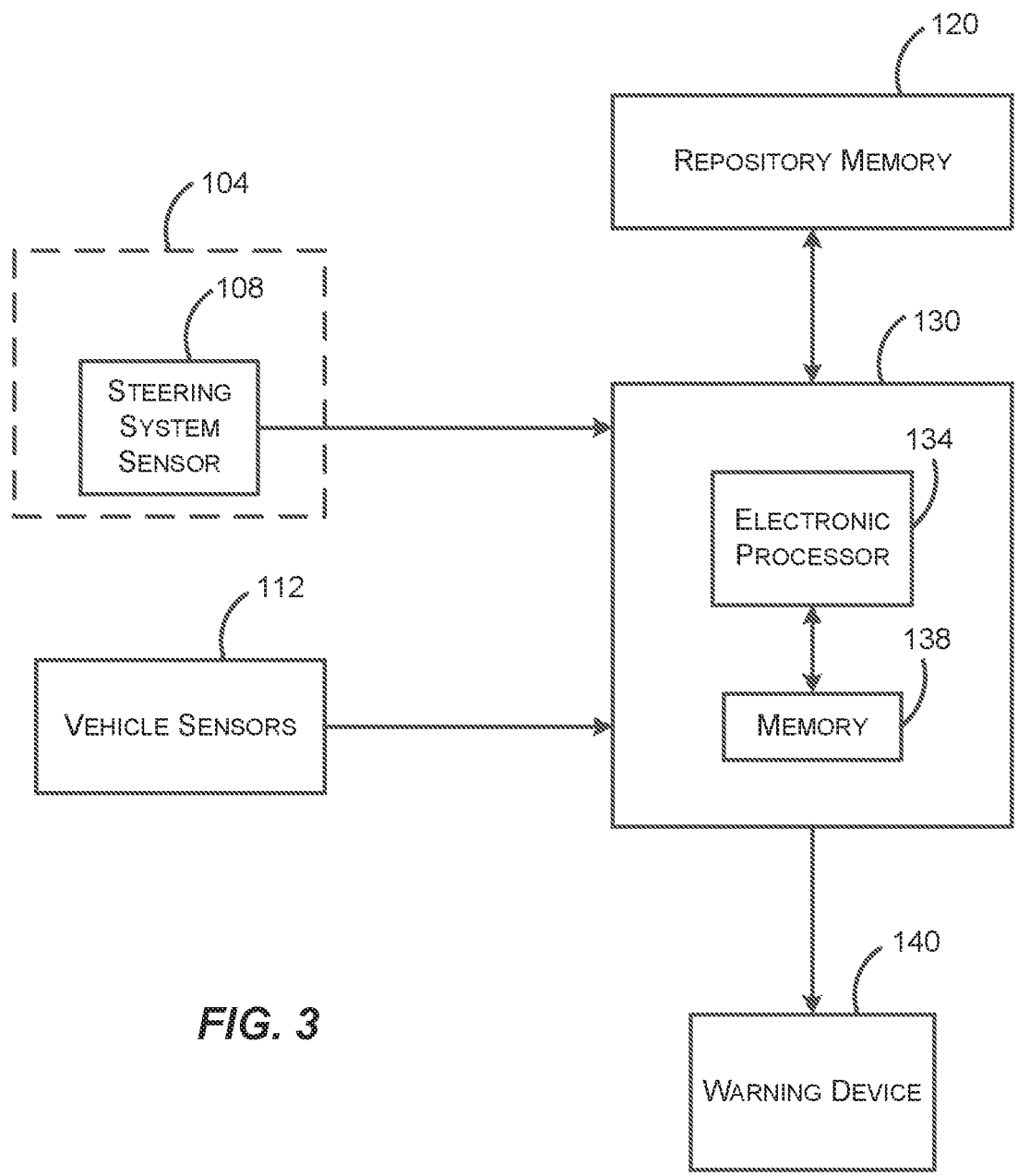
FIG. 3 is a block diagram of a high friction detection system arrangement.

FIG. 3 shows a block diagram of a high friction detection system 100 that includes a steering system 104 that includes steering system sensors 108. The high friction detection system 100 includes vehicle sensors 112 and a repository/memory 120. The repository/memory 120 is disposed on the vehicle and may include any transitory, non-transitory, volatile, non-volatile, magnetic, optical, or electrical media, such as a random access memory (RAM), read-only memory (ROM), non-volatile RAM (NVRAM), electrically erasable programmable ROM (EEPROM), flash memory, or any other digital or analog media.

Further, FIG. 3 shows a correlation block 130 that corresponds to the correlation calculation and compression block 21 shown in FIG. 1 either alone, or in combination with the trigger block 1. The correlation block 130 includes an electronic processor 134 and in some embodiments a memory 138. The electronic processor 134 may include a microprocessor, a digital signal processor (DSP), an application specific integrated circuit (ASIC), a field-programmable gate array (FPGA), or other circuitry. In some embodiments, the processor may include one more levels of caching, such as a level cache memory, one or more processor cores, and registers. The processor core may include an arithmetic logic unit (ALU), a floating point unit (FPU), or any combination thereof. The memory 138 can include any of the memory devices discussed for the repository/memory 120. Further, the memory 138 may include computer-readable instructions that, when executed by the electronic processor 134, cause the high friction detection system 100 to perform instructions provided to execute programs and perform steps to determine a high friction level in the steering system 104.

The high friction detection system 100 includes a warning device 140. The warning device 140 is one or more of an audio, visual and tactile warning. The warning device 140 is part of a vehicle dashboard display in one embodiment. The warning device 140 alerts a vehicle operator to a high friction detection for a vehicle steering system 104.

FIG. 1 shows a trigger block 15 and a correlation, calculation and comparison block 21. In some embodiments, each block includes a separate electronic processor. In another embodiment, the blocks 15, 21 are provided by a single integrated electronic processor.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the spirit and scope of this disclosure.

It is believed that embodiments described herein and many of their attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

We claim:

1. A system to detect high friction in a steering system for a vehicle comprising:
 a plurality of vehicle sensors to monitor vehicle parameters including lateral acceleration, longitudinal acceleration, and a vehicle speed sensor for monitoring the speed of the vehicle;
 a plurality of steering system sensors to monitor steering system parameters including a steering angle sensor for monitoring the steering angle of the vehicle;
 a repository for storing normal values for the plurality of vehicle sensors and the plurality of steering system sensors;
 a correlation block operatively connected to the repository, the plurality of vehicle sensors and the plurality of steering system sensors, and
 a trigger block operatively connected to the correlation block, the vehicle speed sensor and the steering angle sensor, the trigger block activating the correlation block when both the vehicle speed reaches a preset value for vehicle speed and the steering angle of the vehicle reaches a preset value for steering angle,
 wherein the correlation block is configured to compare the vehicle parameters and steering system parameters with data of normal values in the repository to perform an evaluation that calculates values, the correlation block sending a warning signal of high friction in the steering system when one of the calculated values is unrelated to a normal sample, and
 wherein the correlation block operates a Mahalanobis-Taguchi system (MTS) to calculate a Mahalanobis distance (MD) from the one or more vehicle parameters and/or steering system parameters.

2. The system of claim 1 wherein the steering system parameters monitored by the steering system sensors include: steering speed, steering rotor angle, steering rotor speed, steering rotor torque and steering wheel torque.

3. A system to detect high friction in a steering system for a vehicle comprising:
 a first set of sensors to monitor vehicle parameters and/or steering system parameters including a vehicle speed sensor for monitoring the speed of the vehicle and a steering angle sensor for monitoring the steering angle of the vehicle;
 a repository for storing normal values for vehicle parameters and steering system parameters, wherein the repository is configured to learn or acquire normal operating parameters for signals received from a second set of sensors over an operational period for the vehicle;
 a correlation block operatively connected to the repository and to the second set of sensors that monitor vehicle parameters and/or steering system parameters; and
 a trigger block operatively connected to the correlation block and the first set of sensors, and the trigger block activating the correlation block when the vehicle parameters and/or the steering system parameters from the first set of sensors reach a predetermined level,
 wherein the correlation block is configured to compare the vehicle parameters and steering system parameters from the second set of sensors with data of normal values in the repository and performs an evaluation that calculates values, the correlation block sending a warning signal of high friction in the steering system when one of the calculated values from the second set of sensors is unrelated to a normal sample, and
 wherein the correlation block operates a Mahalanobis-Taguchi system (MTS) to calculate a Mahalanobis distance (MD) from the one or more vehicle parameters and/or steering system parameters.

4. The system of claim 3, wherein the trigger block activates the correlation block when the vehicle speed reaches the predetermined level corresponding to a preset value for vehicle speed and when the steering angle of the vehicle reach the predetermined level corresponding to a preset value for steering angle.

5. The system of claim 3, wherein the second set of sensors sense two or more vehicle parameters and/or steering system parameters from a group consisting of: steering rack force, lateral acceleration, longitudinal acceleration, vehicle speed, yaw rate, steering speed, rotor angle, rotor speed, rotor motor torque and steering wheel torque to provide signals to the correlation block for comparison.

6. The system of claim 3, wherein the high friction in the steering system is caused by rust.

7. The system of claim 1, wherein the high friction in the steering system is caused by rust.

8. A system to detect high friction in a steering system for a vehicle comprising:
 a plurality of vehicle sensors to monitor vehicle parameters including a vehicle speed sensor for monitoring the speed of the vehicle, a lateral acceleration sensor, and a longitudinal acceleration sensor;
 a plurality of steering system sensors to monitor steering system parameters including a steering angle sensor for monitoring the steering angle of the vehicle;
 a repository for storing normal values for the plurality of vehicle sensors and the plurality of steering system sensors, wherein the repository is configured to learn normal operating parameters for signals received from the plurality of vehicle sensors and the plurality of steering system sensors over an operational period for the vehicle;

a correlation block operatively connected to the repository, the plurality of vehicle sensors and the plurality of steering system sensors, and a trigger block operatively connected to the correlation block, the vehicle speed sensor and the steering angle sensor, the trigger block activating the correlation block when both the vehicle speed reaches a preset value for vehicle speed and the steering angle of the vehicle reaches a preset value for steering angle, wherein the correlation block is configured to compare the vehicle parameters and the steering system parameters with data of normal values in the repository and provide a Mahalanobis-Taguchi System (MTS) evaluation, the correlation block sending a warning signal of high friction in the steering system when the MTS evaluation determines that any of the parameters has a Mahalanobis distance (MD) that is not normal.

9. The system of claim 8, wherein the high friction in the steering system is caused by rust.

10. The system of claim 3, wherein the evaluation by the correlation block continues until the vehicle parameters and/or the steering system parameters received from the first set of sensors are no longer at the predetermined level.

11. The system of claim 1, wherein the normal values stored in the repository are preloaded based on observation and measurements taken from a steering system that is functionally identical to the steering system being monitored.

12. The system of claim 1, wherein the repository is configured to learn normal operating parameters for signals received from the plurality of vehicle sensors and for signals received from the plurality of steering system sensors.

* * * * *